United States Patent [19]

Linn

[11] Patent Number: 4,525,213
[45] Date of Patent: Jun. 25, 1985

[54] COMPOSITION FOR WATERPROOFING AND INHIBITING EROSION AND CORROSION OF SILICON DIOXIDE CONTAINING SUBSTRATES

[75] Inventor: Michael A. Linn, Omaha, Nebr.

[73] Assignee: Nox-Crete Chemicals, Incorporated, Omaha, Nebr.

[21] Appl. No.: 584,879

[22] Filed: Mar. 2, 1984

[51] Int. Cl.³ .................................................. C09K 3/18
[52] U.S. Cl. ............................................ 106/2; 106/12; 106/13; 106/14.05
[58] Field of Search ..................... 106/14.05, 2, 13, 12

[56] References Cited

U.S. PATENT DOCUMENTS 3,772,065 11/1973 Seiler ..................................... 106/12

Primary Examiner—John Kight
Assistant Examiner—Marvin L. Moore
Attorney, Agent, or Firm—Zarley, McKee, Thomte, Voorhees & Sease

[57] ABSTRACT

A composition for waterproofing and inhibiting corrosion of silicon dioxide containing substrates, such as masonry structures. The composition is from about 7% by weight to about 60% by weight of an alkylalkoxysilane, including oligomers and mixtures thereof, having a molecular weight of from about 100 to about 1000, and a solvent for the silane which can be an aromatic or aliphatic hydrocarbon solvent or mixtures thereof, with the solvent being free of alcohol groups.

16 Claims, No Drawings

COMPOSITION FOR WATERPROOFING AND INHIBITING EROSION AND CORROSION OF SILICON DIOXIDE CONTAINING SUBSTRATES

BACKGROUND OF THE INVENTION

It is known that masonry structures, constructed of concrete, brick, concrete block and the like can have prolonged lives if the substrate structure is coated with a protective sealer and/or coating. All such structures are high in silicon dioxide content, and are subject to varying degrees of environmental decay, erosion, and/or corrosion.

It has been found in the past that certain alkylalkoxysilanes can function as effective waterproofing aids, and decay, erosion and corrosion inhibitors for masonry structures containing silicon dioxide, but compositions which have been heretofore developed for taking advantage of this property of alkyl alkoxysilanes have not been very efficient. For example, U.S. Pat. No. 3,772,065, discloses an alcohol solvent system for alkyltrialkoxysilanes and for their lower oligomers as water repellant impregnants for masonry. However, it has been found in testing that alcohol solvents are substantially ineffective in securing efficient waterproofing performance from such silane impregnants.

Among the disadvantages of an alcohol solvent system are flammability, and very low flash points, and high vapor pressure, allowing the alcohol solvent system to rapidly evaporate, even at ambient conditions. Rapid evaporation means poor and ineffective penetration of the alkylalkoxysilane into the masonry structure. As a result, the water repellancy and corrosion inhibition is not nearly as great, as it otherwise might be; and one must use much higher concentration levels of silane in such impregnants, making the products more expensive.

Accordingly, it is a principal object of the present invention to develop a composition for waterproofing and inhibiting corrosion of silicon dioxide containing substrates such as masonry structures, concrete structures, brick structures and the like, which employs certain highly effective alkylalkoxysilanes in combination with a certain select group of aromatic and aliphatic and oxygenated hydrocarbon solvents, with the solvent being free of alcohol groups. Surprisingly, when this combination is employed, the solvent functions as a highly effective carrier for the alkylalkoxysilane. The solvent itself has a vapor pressure such that it gradually evaporates at ambient conditions. This gradual evaporation allows the penetration of the alkylalkoxysilane into the pores of the masonry structure. As a result, the hydrophobic moiety of the alkylalkoxysilane is deeply impermeated into the masonry structure, with the silane portion of the moiety bonded to silicon dioxide of the masonry substrate.

It is important that no alcohol solvent be present. Alcohol solvent has been found to be undesirable because of its flammability, low flash point, and also in that it at times has a tendency to inhibit the bonding of the silane to the silicon dioxide of the substrate.

It is, of course, a primary objective of the invention to provide the composition mentioned above which is a highly effective waterproofing, decay, erosion and corrosion inhibiting composition for masonry substrates.

It is another objective of the present invention to provide the above composition which allows the alkylalkoxysilane to effectively penetrate the pores of the masonry structure and effectively lock itself to the structure through reaction of the silane moiety with the silicon dioxide of the masonry structure.

It is a further object of the invention to provide specific solvents which enhance significantly the water repellant characteristics of the alkylalkoxysilanes when applied to masonry compositions.

An even further object of the present invention is to provide a composition and method which synergistically act together to cooperatively carry the alkylalkoxysilane impregnate to the masonry structure, and to effectively bond the same to the masonry structure, once penetration is accomplished.

The method and manner of accomplishing each of the above objectives will become apparent from the detailed description of the invention which will follow hereinafter.

SUMMARY OF THE INVENTION

The composition and method for waterproofing and inhibiting corrosion of masonry structures. The composition ideally comprises from about 7% to about 60% by weight of an alkylalkoxysilane in combination with a solvent which coacts and cooperates with the silane, with the solvent being selected from the group of aromatic, aliphatic and oxygenated hydrocarbons or mixtures thereof, with the solvent itself being free of alcohol groups. The invention also relates to a method of waterproofing and inhibiting corrosion of masonry structures which comprises coating such structures with the defined composition.

DETAILED DESCRIPTION OF THE INVENTION

The composition of the invention comprises from about 7% to about 60% by weight of an alkylalkoxysilane, including oligomers and mixtures thereof, having a molecular weight of from about 100 to about 1000, in combination with a solvent for the silane. The solvent is selected from the group consisting of aromatic, aliphatic and oxygenated hydrocarbons, or mixtures thereof. It is critical that the solvent be substantially free of alcohol groups.

The amount of alkylalkoxysilane is broadly from about 7% by weight of the composition to about 60% by weight of the composition and preferably from about 10% by weight of the composition to about 20% by weight of the composition. The best embodiment for most substrates, known at the time of the preparation of this application, is disclosed in the examples and contains about 15% by weight of the alkylalkoxysilane.

The alkyl group of the alkylalkoxysilane can be a $C_1$ to $C_9$ alkyl, preferably a $C_3$ to $C_6$ alkyl group.

The alkylalkoxysilane should have a molecular weight of from about 100 to about 1000, and in addition, may be oligomers of alkylalkoxysilanes, and may also be mixtures of various alkylalkoxysilanes, meeting the criteria mentioned herein.

It is important that the molecular weight be within the range specified in order to accomplish the effective impregnating and water repellant objectives of the invention. If the molecular weight is substantially above 1000, for example, at 2000, it is found that the alkylalkoxysilane molecules are too large to penetrate the pores of the masonry structure. Thus, the molecular weight limitations herein are for the purposes of having the correct steric and/or reaction properties and in addition, have been determined to coact most efficiently with the solvent system of this invention.

The solvent, which is the balance of the composition of the present invention, as heretofore mentioned, coacts with the alkylalkoxysilane to carry it to the proper locality and to enhance its waterproofing characteristics. The solvents which may be employed are aromatic, aliphatic and oxygenated hydrocarbon solvents, or mixtures thereof, with the solvents being free of alcohol groups. The solvents mentioned herein are substantially not DOT flammable, and have a vapor pressure such that they gradually evaporate at ambient temperature. This gradual evaporation characteristic is important, in that it allows sufficient time for the presence of the solvent to function as a carrying vehicle to assure that the waterproofing alkylalkoxysilane is carried to the waterproofing sites of the masonry structure, i.e., penetrates the pores and substantially permeates the underlying masonry substrate.

Generally, the solvent should have a flash point of from about 100° F. to about 160° F., preferably from about 105° F. to about 145° F. In addition, the preferred solvents are those selected from the group consisting of $C_6$ to $C_{10}$ aromatic hydrocarbons, and cyclic hydrocarbons. The most preferred solvents are aromatic hydrocarbons, or mixtures thereof, which are $C_1$ to $C_5$ alkyl benzenes. As illustrated in the examples, the very most preferred at the time of the writing of this application, is a solvent system which is predominantly trimethylbenzene, with a small amount of triethylbenzene. This system has a flash point of 106° F. It has been found that the flash point should generally be above 100° F. in order to assure that the solvent does not too rapidly evaporate.

The composition of this invention can be successfully used to prevent penetration of potentially damaging water and water borne chemicals into masonry structures. It protects the treated substrate from de-icing salt and acid rain damage, and deterioration due to the freeze/thaw cycle, scaling and reinforcing steel corrosion related delamination and spalling. It also is effective because the product does not significantly alter concrete and masonry color, reflective index, or texture.

It has easy application techniques and can be applied vertically and horizontally to surfaces, both indoor and outdoor.

The low molecular weight of the product affords deep penetration, penetrating the micropores to chemically react with the aggregate cement paste matrix, forming an extremely durable and stable hydrophobic reaction product. The stability of the hydrophobic reaction product linkage, or chemical bonding, to micropore peripheries of the masonry structure is a result of the coacting of the aromatic solvent with the alkylalkoxysilane. It is important that no alcohols be present; if they are, proper bonding is significantly impaired, and in some cases substantially absent. With the compositions of this invention, best results are obtained when the treatment is applied to an ambient dry substrate.

The composition may be applied by flooding the surface, either horizontally or vertically, by use of squeegies, brooms, or by low pressure spray apparatus equipped with coarse nozzle orifices, followed by sweeping distribution. The amount which can be employed should be the saturation amount, up to the point of rejection. The composition should be allowed to dry for about 24 hours after application. Generally the treated surface should have a wet surface film for several seconds following the treatment.

The following examples are offered to further illustrate but not limit the process of the composition of the present invention.

EXAMPLES

The composition in accordance with the applicant's invention was prepared. The composition had as its active ingredient, 15% of an organosilane (alkylalkoxysilane) which comprised a mixture of $C_3$ to $C_6$ alkyltrimethoxysilanes, and some oligomers thereof, having a combined total molecular weight within the range of 500 to 600. Fifteen percent of the above referred to alkyltrialkoxysilane was dissolved in a solvent which was predominantly trimethylbenzene with a small proportion of triethylbenzene, such that the final product had the following physical characteristics:
Bulk density: 7.5 pounds per gallon
Astm D88 viscosity at 38° C.: 33 Sec. S.U.S.
Pore point (Astm D97) −32° C.
Astm D92 flash point 41.2° C. (106° F.) and
Astm Dd1500 color less than 0.5-water white
This composition, containing 15% of the active silane, was tested against a composition of U.S. Pat. No. 3,772,065, and a control. The composition of the cited patent contained 40% of isobutyltrimethoxysilane in a solution of ethanol.

The composition of this invention is referred to as Composition 1, the control as "Control" and the comparative compostion of the prior art as Composition 2.

In conducting absorption tests on the composition of this invention (Composition 1), and the Control and comparative Composition 2, 30 concrete cylinders were cast, and five replicas were made for testing of each of the sealers. The specimens were moist cured for 14 days, and then oven dried at 100° C. to constant weight. In this first test, the composition of the invention (Composition 1) was directly compared with the above specified Composition 2, after being applied to the concrete cylinders in conventional fashion until rejection by indications of saturation. Table I below indicates the concrete mix data, with Table II showing the amount of sealer applied, and Table III showing the absorption tests which are the average of five specimens.

TABLE I

| CONCRETE MIX DATA | |
|---|---|
| | lb/cu. yd. |
| Type I cement | 564 |
| Algonquin, IL Sand | 1277 |
| Eau Claire, WI. Gravel | 1908 |
| Water | 233 |
| Neutralized Vinsol Resin | 1123 ml. |
| Slump, in. | 3.3 |
| Air content, % | 5.0 |

TABLE II

| AMOUNTS OF SEALERS APPLIED | |
|---|---|
| Sealer | Grams/3 × 6 in. Cylinder |
| Composition 1 | 12.1 |
| Composition 2 | 11.8 |

TABLE III

| | ABSORPTION TESTS* | | |
|---|---|---|---|
| Immersion | Absorption, % | | |
| | Sealer No. | | Control |
| in Water | 1 | 2 | (No Sealer) |
| 48 hours | 0.3 | 0.3 | 4.4 |
| 24 hr boil | 2.2 | 1.7 | 4.8 |
| 7 days | 3.0 | 2.5 | 4.9 |
| 14 days | 3.3 | 2.8 | 4.9 |
| 21 days | 3.5 | 3.0 | 4.9 |
| 28 days | 3.6 | 3.0 | 5.0 |
| 35 days | 3.7 | 3.1 | 5.0 |
| 42 days | 3.8 | 3.2 | 5.0 |
| 49 days | 3.8 | 3.2 | 5.0 |
| 56 days | 3.8 | 3.3 | 5.0 |

*Each result is the average of 5 specimens.

It will be seen that in each instance, the composition of this present invention was at least as good at sealing effectiveness (see Table III) as composition No. 2 which contained two and one-half times (2½) more active silane than the applicant's. This shows that applicant's composition, in spite of only containing the much smaller amount of 15% active, was far more effective as a penetratng sealer.

Similar tests were conducted with the same compositions as mentioned above in order to confirm the first test. Similar absorption tests were conducted with the same compositions as mentioned above in 15% sodium chloride solution in order to confirm the first test and to demonstrate comparative effectiveness of the composition in preventing permeation of treated substrates. (Chloride ion being the substantial force of steel reinforcement corrosion in masonry structures, and therefore responsible for masonry cracking, delamination, and spalling). In this test, the fabrication of the test specimens which were 4×4 inch concrete tubes, was in a similar manner to that previously discussed. Sealers were applied until a point of saturation rejection. Absorption testing, drying time and chloride ion determinations were then conducted. Four replicas were tested for each sealer, and the control. The concrete mix data is shown on Table IV below.

TABLE IV

| CONCRETE MIX DATA | |
|---|---|
| | LB/CU. YD. |
| Type I Cement | 497 |
| Algonquin, IL. Sand, SSD | 1584 |
| Thornton, Il. Limestone No. 67 SSD | 1630 |
| Water | 258 |
| Neutralized Vinsol Resin | 830 ml. |
| Slump. in. | 3.2 |
| Air content, % | 6.0 |

Table V shows the percentage weight losses during the 21 day drying period following the initial seven day water cure. The amounts of sealer applied after this 21 day drying period are shown in Table VI.

TABLE V

| AIR DRYING PERIOD AFTER 7 DAYS WATER CURE | | | |
|---|---|---|---|
| Designated | WEIGHT LOSS, % | | |
| Sealer | 7 Days | 14 Days | 21 Days** |
| 1 | 1.68 | 1.93 | 2.08 |
| 2 | 1.65 | 1.92 | 2.10 |
| Control | 1.69 | 1.96 | 2.13 |

*Each result is the average of 4 specimens
**Sealers applied at the end of this drying period.

TABLE VI

| AMOUNT OF SEALERS APPLIED AFTER 21 DAY DRYING PERIOD | | |
|---|---|---|
| | Sealer | Grams/4 × 4 in. Cube |
| | 1 | 15.0 |
| | 2 | 14.5 |
| Control | None-Control | — |

Table VII shows the percentage weight gains during 21 days immersion in 15% sodium chloride solution.

TABLE VII

| WEIGHT CHANGES FOR SPECIMENS IMMERSED IN 15% NaCl SOLUTION | | | | | | | |
|---|---|---|---|---|---|---|---|
| | Weight Gain, %* | | | | | | |
| Sealer No. | 3 days | 6 days | 9 days | 12 days | 15 days | 18 days | 21 days |
| 1 | 0.18 | 0.30 | 0.36 | 0.40 | 0.43 | 0.46 | 0.54 |
| 2 | 0.24 | 0.33 | 0.39 | 0.43 | 0.46 | 0.49 | 0.56 |
| Control | 2.36 | 2.47 | 2.53 | 2.56 | 2.59 | 2.61 | 2.68 |

*Relative to weight after 21 days air drying.

The weight losses during 24 days of air drying, following the 21 day immersion in the chloride solution, are shown in Table VIII.

TABLE VIII

| AIR DRYING PERIOD AFTER IMMERSION IN 15% NaCl SOLUTION | | | | | | | | | |
|---|---|---|---|---|---|---|---|---|---|
| | Weight Loss, %* | | | | | | | | |
| Sealer No. | 3 days | 6 days | 9 days | 12 days | 15 days | 18 days | 21 days | 22 days | 23 days | 24 days |
| 1 | 0.28 | 0.36 | 0.41 | 0.46 | 0.49 | 0.52 | 0.55 | 0.60 | 0.63 | 0.66 |
| 2 | 0.35 | 0.41 | 0.46 | 0.51 | 0.54 | 0.56 | 0.59 | 0.63 | 0.66 | 0.69 |
| Control | 0.75 | 0.97 | 1.12 | 1.24 | 1.33 | 1.40 | 1.48 | 1.57 | 1.62 | 1.67 |

*Relative to weight after 21 days immersion in 15% NaCl solution

The results of chloride ion content determinations on the concrete cube specimens, are shown in Table IX.

TABLE IX

| CHLORIDE ION CONTENT OF CONCRETE SPECIMENS | |
|---|---|
| Sealer No. | Total Chloride Ion Concentration, % by Weight of Concrete |
| 1 | 0.121 |
| 2 | 0.122 |
| Control | 0.357 |
| Control* | 0.066 |

*Control not subjected to chloride immersion test, base chloride level of concrete.

It can be seen that in terms of all of the tests, that the applicant's composition, containing only 15% of the specified alkylalkoxysilane, achieves substantially equivalent results with the much higher 40% containing alkylalkoxysilane of the prior art comparative composition which contain ethanol solvent.

While in the examples herein mentioned and in the application, the applicant's composition has shown aromatic and aliphatic hydrocarbon solvents, there is now ongoing active investigation of the use of certain non-alcohol containing oxygenated solvents including lower ketone and esters. The preliminary testing has indicated the lower ketones and esters may show possibilities for use as substitutes for the aromatic and aliphatic hydrocarbon solvents in geographic areas where regulations might prohibit some of the solvents heretofore mentioned.

What is claimed is:

1. A composition for waterproofing and inhibiting erosion and corrosion of silicon dioxide containing substrates, such as masonry structures, steel reinforced masonry structures and the like, comprising:
   from about 7% by weight to about 60% by weight of an alkylalkoxysilane including oligomers and mixtures thereof, having a molecular weight of from about 100 to about 1000; and
   a solvent for said silane, selected from the group consisting of $C_6$ to $C_{10}$ aromatic and cyclic hydrocarbons, or mixtures thereof, said solvent being free of alcohol groups and having a flash point of from 100° F. to about 160° F.

2. The composition of claim 1 wherein the amount of said silane is from about 10% by weight to about 20% by weight of said composition.

3. The composition of claim 2 wherein the amount of said silane is about 15% by weight of said composition.

4. The composition of claim 1 wherein the solvent is substantially DOT non-flammable.

5. The composition of claim 4 wherein the solvent has a vapor pressure, such that it is substantially DOT non-flammable, but nevertheless gradually evaporates at ambient temperature and pressure.

6. The composition of claim 6 wherein the flash point is from about 105° F. to about 145° F.

7. The composition of claim 1 wherein the alkyl group of said silane is a $C_1$ to $C_9$ alkyl.

8. The composition of claim 7 wherein the alkyl group is a $C_3$ to $C_6$ alkyl.

9. The composition of claim 1 wherein the alkoxy group is $C_1$ to $C_9$ alkoxy group.

10. The composition of claim 1 wherein the solvent is selected from the group consisting of $C_6$ to $C_{10}$ aromatic hydrocarbons, cyclic hydrocarbons.

11. The composition of claim 10 wherein the aromatic hydrocarbon is a $C_1$ to $C_5$ alkylbenzene, or mixtures thereof.

12. The composition of claim 11 wherein the alkylbenzene is a mixture which is predominantly trimethylbenzene with a small amount of dimethylbenzene, blended to have a flash point of greater than 100° F.

13. The composition of claim 12 wherein the flash point is about 106° F.

14. A method of waterproofing, and enhancing the erosion and corrosion resistance of silicon dioxide containing substrates, such as masonry structures, and steel reinforced masonry structures comprising:
   applying, to the point of substantial surface saturation of said structure, a composition comprising from about 7% by weight to about 60% by weight of an alkylalkoxysilane, including oligomers and mixtures thereof, having a molecular weight of from about 100 to about 1000, in combination with a $C_6$ to $C_{10}$ aromatic or cyclic hydrocarbon solvent, which is substantially free of alcohol groups and having a flash point of from 100° F. to about 160° F.

15. The method of claim 14 wherein the amount of silane is from 10% to about 20% by weight of said composition.

16. The method of claim 15 wherein the solvent is a $C_6$ to $C_{10}$ aromatic hydrocarbon solvent.

* * * * *